United States Patent [19]

Katz

[11] 4,357,047
[45] Nov. 2, 1982

[54] TRAILER WITH UNITARY BOTTOM RAIL-SCUFF PLATE

[75] Inventor: Sol Katz, Meadowbrook, Pa.

[73] Assignee: Strick Corporation, Ft. Washington, Pa.

[21] Appl. No.: 209,559

[22] Filed: Nov. 24, 1980

[51] Int. Cl.³ ............................................. B62D 33/04
[52] U.S. Cl. ....................................... 296/181; 52/264; 220/1.5; 296/199
[58] Field of Search ............... 296/181, 182, 183, 199, 296/35.1; 52/264; 220/1.5, 4 F

[56] References Cited

U.S. PATENT DOCUMENTS

| | | | |
|---|---|---|---|
| 3,102,498 | 9/1963 | Dean | 105/397 |
| 3,353,863 | 11/1967 | Koot | 52/264 |
| 3,363,231 | 1/1968 | Grosgebauer | 296/181 |
| 3,563,403 | 2/1971 | Luisada | 220/4 F |
| 3,563,578 | 2/1971 | Meller | 52/264 |
| 3,989,157 | 11/1976 | Veenema | 220/84 |
| 4,015,876 | 4/1977 | Hulverson et al. | 296/28 |
| 4,046,278 | 9/1977 | Chieger | 220/1.5 |
| 4,121,732 | 10/1978 | Hickey | 220/1.5 |

Primary Examiner—Joseph F. Peters, Jr.
Assistant Examiner—John A. Carroll
Attorney, Agent, or Firm—Seidel, Gonda, Goldhammer & Panitch

[57] ABSTRACT

The housing of a wheeled trailer has a discrete bottom rail-scuff plate along the bottom end of each side wall. Each scuff plate is coupled to the bottom wall of the housing and extends upwardly from the floor surface for a height of at least eight inches. The upper end portion of each scuff plate supports the lower ends of inner and outer panels of the side wall whereby the inner surface of the bottom rail acts as a scuff plate to protect the inner panels from being scuffed by the load or lift trucks for handling the load.

8 Claims, 3 Drawing Figures

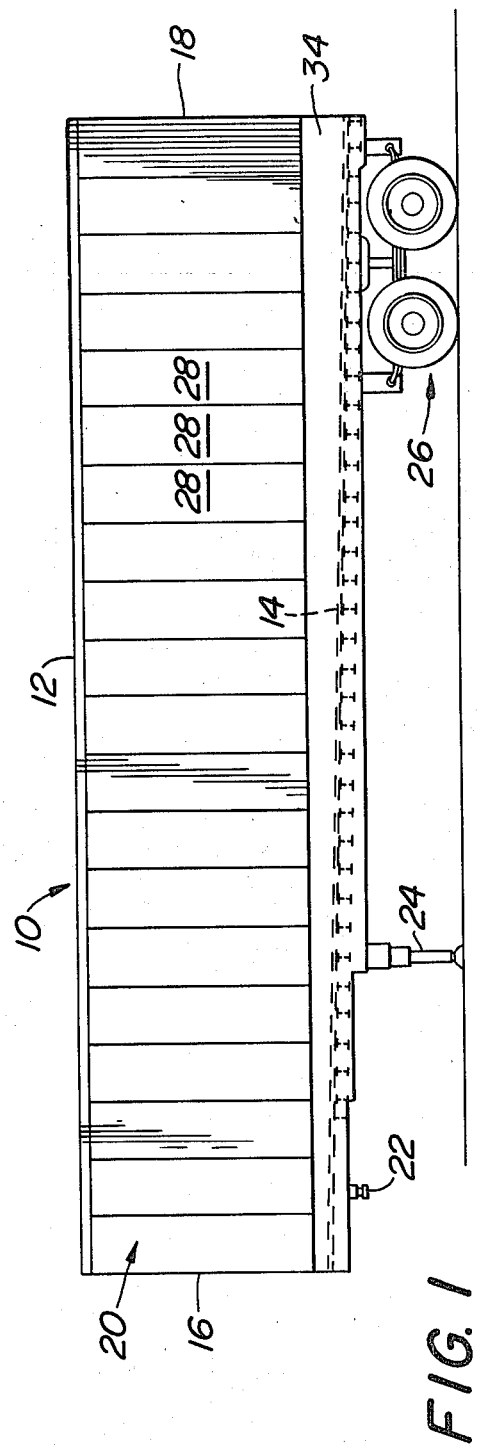
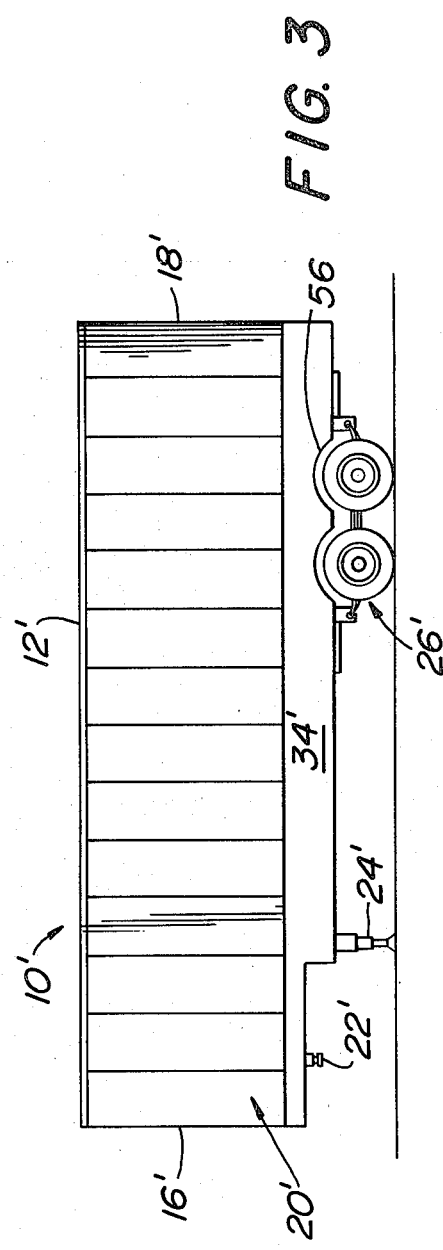

TRAILER WITH UNITARY BOTTOM RAIL-SCUFF PLATE

BACKGROUND

A typical trailer housing has top and bottom walls connected together by side walls and end walls. At least one of the walls includes an access door. The side walls typically have inner and outer panels connected to a bottom rail. To protect the inner panels from damage by contact with goods and/or loading equipment such as a fork lift truck, it is known to provide a scuff plate at the bottom end of the inner panels adjacent the floor. Thus, in a conventional construction the side wall adjacent the floor is comprised of three layers, namely the outer panels, the inner panels, and the scuff plate.

The present invention seeks to simplify the aboveidentified construction whereby there is only one plate which is both a bottom rail and a scuff plate while at the same time elevating the inner panels from the elevation of the floor so as to prevent the inner panels from being scuffed.

The side wall to floor connection in the railroad car disclosed in U.S. Pat. No. 3,102,498 bears a superficial resemblance to the present invention. In that patent, the vertical posts and outer panels are secured to the upper end of an outer plate and the upper end of an inner plate. The lower end of the inner plate and outer plate are secured to each other and to a sidesill. The arrangement disclosed in that patent places the outward projection of the side wall above the car floor whereby it will clear the loading platform at railroad station stops. Said patent does not recognize the problem involved nor does it suggest a solution disclosed hereinafter.

SUMMARY OF THE INVENTION

A tractor driven wheeled trailer housing typically has top and bottom walls connected together by side walls and end walls. At least one of the walls includes an access door. In such a typical housing, the improvement comprises a discrete bottom rail-scuff plate along the bottom end of the side wall. Each such scuff plate is coupled to the bottom wall and extends upwardly from the floor surface for a height of 8 inches to 24 inches with a preferred height of approximately 16 inches. The upper end portion of each scuff plate supports the lower end of inner panels and outer panels of the side wall. The inner surface of the scuff plate protects the side wall from scuffing by locating the side wall above a scuff zone.

It is an object of the present invention to provide a trailer housing with a simplified wall construction while preventing damage to the side wall due to scuffing.

It is another object of the present invention to provide a unitary bottom rail-scuff plate which will accommodate conventional trailer, a wedge shaped trailer as well as a drop frame trailer in a simple, efficient, and inexpensive manner.

Other objects will appear hereinafter.

For the purpose of illustrating the invention, there is shown in the drawing a form which is presently preferred; it being understood, however, that this invention is not limited to the precise arrangements and instrumentalities shown.

FIG. 1 is a side elevation view of a typical trailer in accordance with the present invention.

FIG. 3 is a side elevation view similar to FIG. 1 but showing a drop trailer.

DETAILED DESCRIPTION

Figure 2:
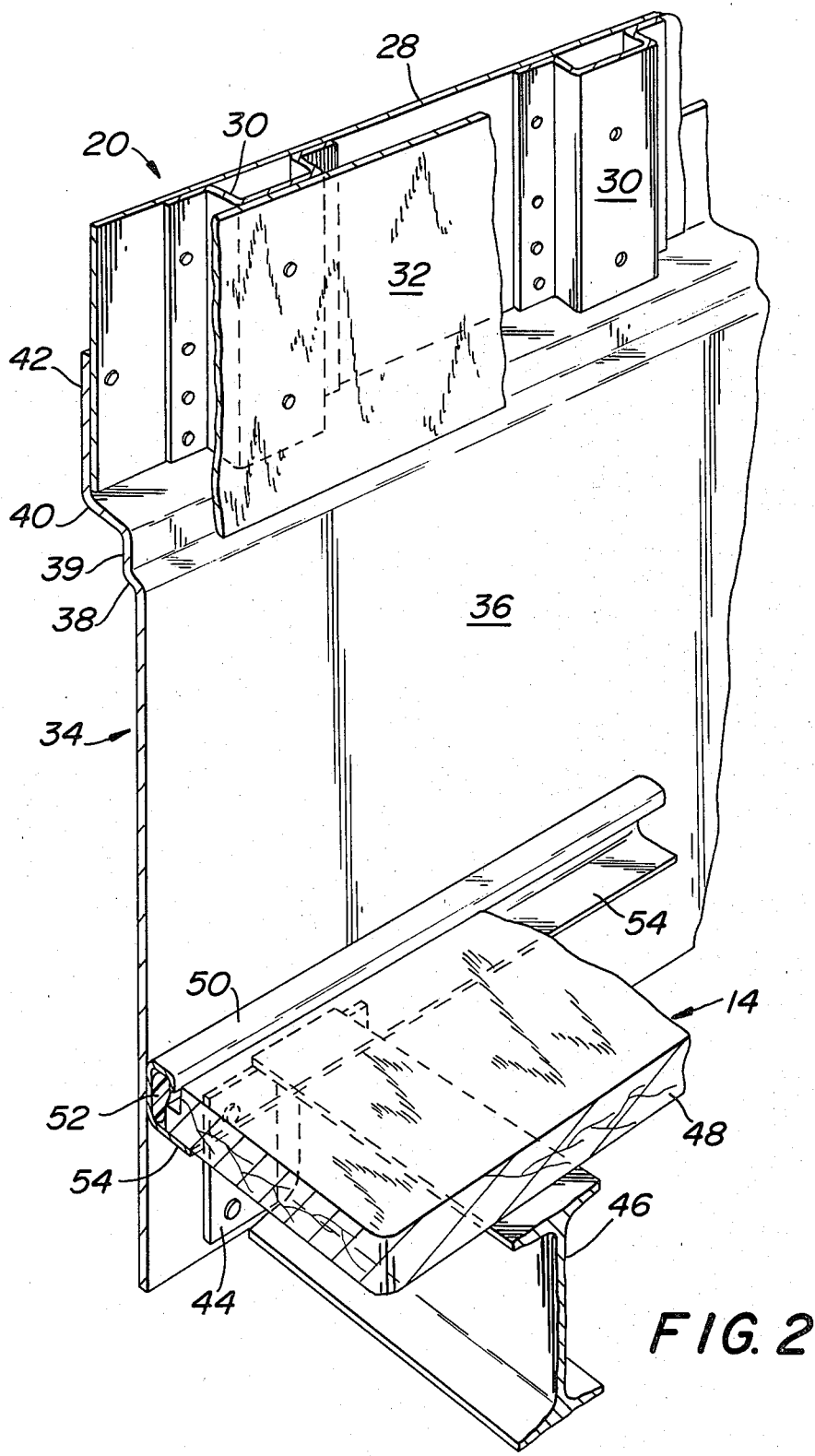
FIG. 2 is an enlarged partial perspective view of the coupling of the side wall to the floor.

Referring to the drawing in detail, wherein like numerals indicate like elements, there is shown in FIG. 1 a trailer housing designated generally as 10. The trailer housing 10 is adapted to be driven by a tractor. Housing 10 includes a top wall 12 connected to a bottom wall 14 by end walls 16 and 18 and side walls 20. The trailer 10 is preferably provided with a king pin 22 at one end, a wheel support assembly 26 adjacent the opposite end, and a retractable landing gear 24 intermediate the ends thereof.

Referring to FIG. 2, the side wall 20 is defined by outer panels 28 riveted to one surface of upright posts 30. Inner panels 32 are releasably anchored to an opposite surface of the post 32. Panels 28 are typically aluminum panels while panels 32 are typically ¼ inch thick plywood. The panels 28 are all of the same height as shown in FIG. 1. Similarly, all of the panels 32 are of the same height.

As shown in FIGS. 1 and 2, the side wall 20 is supported by a bottom rail-scuff plate designated generally as 34. The bottom rail-scuff plate 34 is a rigid structural member made from a material such as steel with a thickness of about ⅛ of an inch. The bottom rail-scuff plate 34 is extruded or formed so as to have a vertical straight portion 36 for most of its height, an offset horizontal portion 38, a short vertical portion 39, an offset horizontal portion 40, and a vertical portion 42. The panels 28 and posts 30 are riveted to the portion 42 and rest on the portion 40. The lower end of the panels 32 rest on the portion 38. Portion 36 extends upwardly from the elevation of the floor 14 by a height of 8 to 24 inches preferably approximately 16 inches so as to place the lower end of the panels 32 outside of the scuff zone.

The floor 14 is supported by a sill assembly which includes transverse I-beams 46 having sill plates 44 welded to their ends. Each plate 44 is bolted, riveted or welded to the lower end portion of the bottom rail-scuff plate 34.

A seal retainer 50 is provided between the portion 36 and the ends of the floor panels 48. Within the retainer 50 there is provided an elastomer seal 52. Retainer 50 has a flange 54 which overlies the I-beams 46 and is disposed beneath the floor panels 48.

As shown more clearly in FIG. 1, the bottom railscuff plate 34 has parallel upper and bottom surfaces and is horizontally disposed. Adjacent the front end, the bottom rail-scuff plate 34 is notched or otherwise machined so as to have a shorter vertical height. See the left end of FIG. 1. Due to the height of the bottom rail-scuff plate 34, the floor 14 may slope toward the rear of the housing as shown in FIG. 1 so as to provide a wedge shaped trailer wherein the floor to ceiling height at the end wall 18 is greater than that at the end wall 16 by about 6 to 8 inches.

In FIG. 2, there is illustrated a side elevation view of a trailer in accordance with another embodiment of the present invention designated generally as 10'. The trailer 10' is identical with trailer 10 except as will be made clear hereinafter. Hence, corresponding prime numerals have been applied to the embodiment shown in FIG. 3.

The trailer 10' is a drop trailer which is easily constructed in accordance with the present invention since the bottom rail-scuff plate 34' has sufficient height whereby cutout portions 56 may be provided to accommodate the wheels or tires of the wheel support assembly 26'. The bottom rail-scuff plate 34' is of reduced height adjacent the end 16' as shown in FIG. 3 so that the king pin 22' will be at the proper elevation and to provide space for receiving the tractor. Thus, the unitary bottom rail-scuff plate feature of the present invention enables the trailer to have different configurations. Another advantage of the present invention is cost. A wall 20 costs more than the single thickness plate per square foot. Hence, from a design consideration the bottom rail-scuff plates 34, 34' should be as high as possible without risk ripple failure.

The present invention may be embodied in other specific forms without departing from the spirit or essential attributes thereof and, accordingly, reference should be made to the appended claims, rather than to the foregoing specification, as indicating the scope of the invention.

I claim:

1. A trailer housing having top and bottom walls connected together by side walls and end walls, at least one of said walls including an access door, the improvement comprising a discrete metal scuff plate along the bottom end of each side wall, each scuff plate having its lower end connected to a support for the bottom wall and extending upwardly from the floor surface of the bottom wall for a height of at least 8 inches, the upper end portion of each scuff plate having an inner surface exposed to the interior of the housing, said side wall having an inner surface generally flush with said inner surface on said scuff plate, whereby the housing has a scuff zone adjacent the floor surface of the bottom wall with the scuff zone defined by the height of said scuff plate between the elevations of the floor surface and the lower end of said side wall, the scuff zone being characterized by a single thickness of said scuff plate.

2. A housing in accordance with claim 1 wherein the side wall is defined by outer panels and inner panels supported in spaced relation by the upper end of said scuff plate.

3. A housing in accordance with claim 2 wherein the lower end of the inner panels is at a lower elevation as compared with the lower end of the outer panels, said scuff plate upper end portion having offset horizontal portions for supporting the lower ends of the inner and outer panels at different elevations.

4. A housing in accordance with claim 1 wherein said floor surface of the bottom wall slopes from one end of the housing toward the other end so as to have a wedge shaped interior, the amount of slope of said floor surface being less than the vertical height of said scuff plate inner surface.

5. A housing in accordance with claim 1 wherein said scuff plate has a vertical height at one end which is less than the vertical height at the other end while having parallel horizontal top and bottom edges.

6. A trailer housing having top and bottom walls connected together by side walls and end walls, at least one of said walls including an access door, one end of said housing having a wheel assembly, the other end of said housing having a king pin, a discrete bottom rail-scuff plate along the lower end of each side wall, each bottom rail-scuff plate having horizontally disposed top and bottom edges, said bottom wall including a sill assembly supporting floor panels, each bottom rail-scuff plate having its lower end connected to said assembly, each bottom rail-scuff plate having a vertically disposed portion extending upwardly from the elevation of the floor panels for a distance of 8 to 24 inches, each side wall including outer panels an inner panels connected to vertical posts, the lower ends of said side wall panels being supported by the upper end portion of its associated bottom rail-scuff plate, said side wall outer panels being of uniform height and being vertically disposed, and said side wall inner panels being generally flush with said vertical portion of said bottom rail-scuff plate.

7. A housing in accordance with claim 6 wherein the bottom wall slopes from the front end to the rear end with the amount of slope being less than the height of said plate.

8. A housing in accordance with claim 6 wherein the lower edge of said plate has at least one cut out adjacent the upper end of a wheel assembly.

* * * * *